United States Patent Office 3,279,081
Patented Oct. 18, 1966

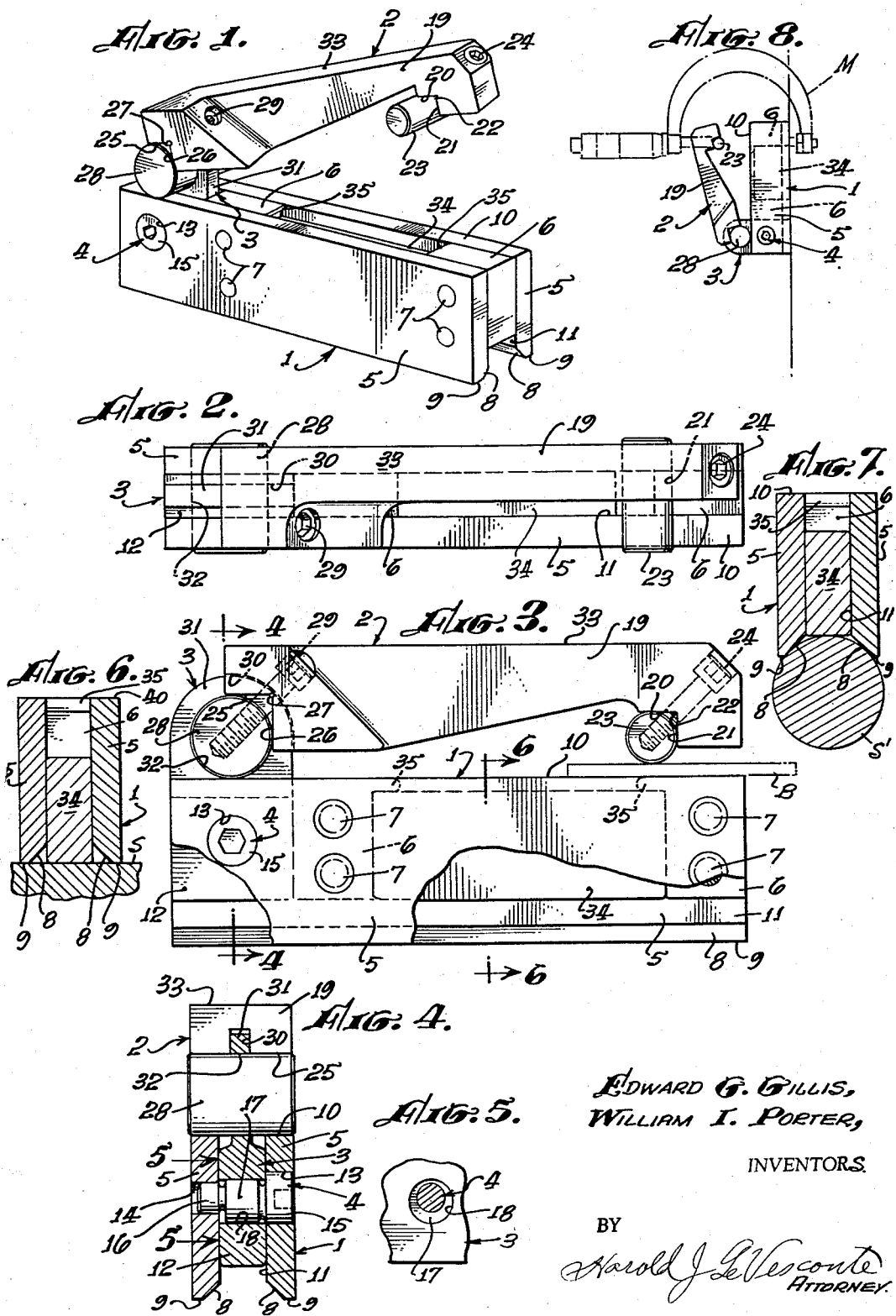

3,279,081
SINE BAR DEVICE
Edward G. Gillis, Rte. 6, Box 900, and William I. Porter, 620 Arizona St. SE., both of Albuquerque, N. Mex.
Filed Apr. 8, 1964, Ser. No. 358,346
8 Claims. (Cl. 33—174)

This invention relates to means for the accurate measurement and establishment of angles and angular relations by machinists and tool and die makers.

The instrumentality most commonly used for such measurement and establishment is a tool known as a sine bar comprising a rigid, elongated member carrying a pair of spaced parallel cylindrical bodies disposed at a predetermined center distance from each other. When one of these bodies is resting on a flat surface with the other disposed spaced from the surface, the distance between the center line of other said bodies in a plane parallel to the surface along a line normal to said plane and divided by a distance between the center lines of said bodies (usually in inches), the resulting figure is the sine of the angle between the plane of the surface and a plane containing the axial lines of the two cylindrical bodies.

Heretofore the setting up of a sine bar for such measurements has often been a tedious and time consuming job and the present invention takes this fact into consideration by a proposal whereby the sine bar is carried by a base on which it may be angularly adjusted and secured.

Accordingly, the principal objects of the invention are to provide a combined sine bar and base on which the sine bar is mounted characterized by a design adapted to facilitate accurate, economical manufacture, accessibility for obtaining sine measurement, capacity for self attachment to both curved and flat surfaces, and means for locking it in any angular position to which it may be moved without distortion or variation of such position.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a perspective view of a sine bar and base device constituting a presently preferred embodiment of the invention, FIG. 2 is an enlarged scale, top plan view of the device shown in FIG. 1, FIG. 3 is a side elevational view on the same scale as FIG. 1, the sine bar component being brought into horizontal parallel relation to the base component, FIG. 4 is a fragmentary sectional view taken on the line 4—4 of FIG. 3, FIG. 5 is a fragmentary sectional view taken on the line 5—5 of FIG. 4, FIGS. 6 and 7 are transverse sectional views of the base component of the device as viewed on the line 6—6 of FIG. 3 showing the mounting thereof on a flat surface and on a curved surface, respectively, and FIG. 8 is a side elevational view showing the device self-attached on a vertical surface.

Referring to the drawings, the illustrated embodiment comprises, other than a magnet means useful to secure the device in certain positions of use and to which further reference will be made, a hollow base component 1, a sine bar component 2, a sine bar mounting member 3, and a locking means 4 for said mounting member. The base component 1 comprises a pair of side members 5, 5 of generally elongated rectangular configuration in side and in end elevation and formed (except for a difference hereinafter to be noted) as mirror image opposites; said side members being preferably formed of hard, para-magnetic material and being held in spaced parallel relation by interposed spacer blocks 6, 6 at or adjacent the ends thereof and secured thereto in any appropriate manner as, for example, by shrink fitted dowel pins or by screws as at 7.

For convenience in description, the side of the base component which is adjacent the sine bar component will be referred to as the top or upper surface and the end of the base member to which the sine bar component is attached will be termed the rear end of the device and other components and other portions of the various parts will be correspondingly designated.

The bottom surfaces of the side members 5, 5 at the sides thereof adjacent each other are beveled as at 8, 8 to form a V-surface adapted to facilitate mounting of the base component on a cylindrical surface indictated in broken lines in FIG. 1 and in section in FIG. 7 and the outer portions of said bottom surfaces are flat as at 9, 9 and lie in the same plane to facilitate mounting of the base component on a flat surface. The top surfaces of the base component side members 5, 5 lie in a common plane to form a top surface generally designated at 10 and this surface is parallel to the plane containing the bottom flat surfaces 9, 9 and parallel also to the axial line of any curved surface engaged by the beveled faces 8, 8. Additionally, all other side and end faces are ground to be parallel with their complementary faces and at right angles to the planes of the faces which the join. The rear spacer block 6 is disposed sufficiently forward of the rear end of the base component to provide a slot 11 between the rear ends of the members 5, 5 in which slot the lower end 12 of the sine bar mounting member 3 is slidingly fitted. Referring to FIGS. 4 and 5, it will be noted that the rear end of one of the side members 5 has a larger transverse bore 13 extending therethrough while the other of said side members has a smaller bore 14 extending therethrough in axial alignment with the bore 13; said bores affording bearing support for the axially aligned larger and smaller ends 15 and 16 of the rotatable locking member 4, said member having an eccentric member 17 disposed thereon within the confines of the slot 11 and closely fitting a bore 18 in the said lower end 12 of the sine bar mounting member 3. This difference in the size of the bores 13 and 14 is the only difference between the said mirror image side members 5, 5.

The sine bar component 2 includes a body member 19 preferably formed of a bar of hardened metal extending parallel to the length of the base component 1 and at the front end thereof is provided with a downwardly facing surface 20 and a rearwardly facing transverse surface 21 disposed at right angles thereto and combining therewith to form a V 22 in which a cylindrical bar of hardened metal 23 is secured by suitable means such as a screw 24 extending through the forward end of the body member 19 and threadedly engaging the cylindrical bar 23. The body member 19, except for the rear portion thereof is of decidedly less width than the base component and generally overlies one only of the side members 5 with the cylindrical bar 23 carried thereby overlying the exposed portion of the base component as best shown in FIGS. 1 and 2 and whereby an outside micrometer may be applied between the outer side of the bar 23 and base surface 9.

The rear end of the sine bar body member 19 is provided with a downwardly facing surface 25 and a rearwardly facing surface 26 combining therewith at right angles thereto to form a second transverse V 27 which is parallel to the V 22 and in which a second cylindrical bar of hardened metal 28 is secured by a screw 29 in the same general manner as the bar 23 is secured. The rear end of the member 19 is provided with a longitudinally extending medial slot 30 extending across the V 27 and the upper end 31 of the mounting member 3 extends in closely fitting relation in this slot and is provided with a transverse bore 32 in which the bar 28 is journaled to hingedly support the rear end of the sine bar component. By this hinge means, the sine bar component may be moved about the axial line of the cylindrical bar when the member 3 is elevated by the rotation of the locking means 4 sufficiently to move the bar 28 free of the top surface 10 of the base component. After the sine bar component has been moved to a desired angular position, the locking member 4 is rotated by suitable wrench means to bring the mounting means 3 downwardly and the bar 28 into tight engagement with the top surface 10 of the base component, it being noted that the rear face of the rear spacing block 6 is vertical and in such close proximity to the parallel edge face of the mounting member 3 as to preclude all but limited rocking movement thereof about the eccentric 17, wherefore, the locking movement will not affect the angular position to which the sine bar component may have been moved.

Preferably, the front cylindrical bar 23 is of such lesser diameter than the bar 28 that when it is in contact with an interposed thickness gage of predetermined thickness resting on the top surface 10 of the base component, the top surface 33 of the sine bar frame member 19 is parallel to the top and bottom surfaces of the base component. Additionally, the downwardly facing surfaces 20 and 25 are so disposed that the axial lines of the bars 23 and 28 are contained in a plane which is parallel to the surface 33. The distance between the axial lines of the cylindrical bars 23 and 28 is accurately determined as is also the respective identical distances thereof from the top surface 33. This is most readily achieved by forming the V-shaped recesses in which the bars are secured by surfaces which are parallel to the plane of the surface 33 and associated surfaces which are at right angles thereto. This permits these bar receiving and locating surfaces to be accurately machined by grinding operations.

In a typical use, assuming the use of a version of the device in which the height of the base between the surfaces 9 and 10 is 1.00", the spacing between the axial lines of the bars 23 and 28 is 2.500", and the diameters of the bars 23 and 28 are, respectively, .300" and .500", it is obvious that with a spacing block B .100" thick inserted between the bar 23 and the surface 10, the axial lines of the bars lie in a common plane parallel to the surface 10, wherefore, the sine value is zero. It will also be obvious that at any angle to which the sine bar component is moved, the overall dimension between the surface 9 of the base and the remote point on the bar 23 less the dimension similarly obtained at the said zero value will be indicative of the sine of the angle. In the present example that zero value would be comprised of the thickness of the base, 1.00" the spacing block, .100" and the diameter of the bar 23, .300" or a toal of 1.400". Assuming now that the sine bar is swung to a position at which the micrometer measurement is 2.650" as determined, for example, by a micrometer M as shown in FIG. 8, subtracting the base figure, 1.400", from this figure gives a net figure of 1.250.

Standard sine bars have the cylindrical members thereof spaced 5.00" apart which is twice the amount of the exemplar under consideration. Standard sine tables for use with these bars are in common use in which the sine values for each angle are five times the values based on unity. Doubling the value above obtained to compensate for the lesser distance between the sine bar cylinders gives a value of 2.500 which on the sine bar tables above referred to indicates an angle of 30°. If the reference is to a table of trigonometric functions based on unity, the figure of 1.250 would be divided by 2.5 giving a sine value of .500 similarly indicating an angle of 30°.

The device is especially useful in accurately determining or establishing very small angles in which the sine value must be established in increments on .0001. All gauge block sets have a basic block of .100" thickness and such other blocks as singly or in combination will establish other dimensions in increments of .0001". Accordingly, gauge blocks or combinations thereof can be inserted between the bar 23 and the base surface 10 and the thickness thereof, less the base dimension of .100" will be the value to be employed to determine the sine value of the angle involved. By way of example, assume that the sine bar component 2 is moved to the desired position by the insertion of gauge block means of a total thickness of .1454" between the surface 10 and the bar 23. Subtracting the amount of .100" from this figure gives a net figure of .0454 and this multiplied by 2 gives a value of .0908 which on reference to the sine bar tables above mentioned would indicate an angle of slightly more than 1° 2'. Alternatively, the micrometer dimension of 1.4454" treated as in the first example would give the same result.

There remains to be described, the magnet means for attaching the device to various magnetic surfaces. This magnet device comprises a rectangular, permanently magnetized bar 34 adapted to be loosely self-contained in the space defined by the sides of the base component side members 5, 5 and between the adjacent faces of the spacing blocks 6, said spacing blocks at their upper edges having overhanging lip portions 35 as best shown in FIG. 3 operative to prevent passage of the magnet 34 completely through the recess in which it is thus housed. Since the base is formed of steel, the magnet is, of course, self-retaining in the space within the base and is movable relative to said space in the opening in the workpiece engaging surface formed by the side members and spacing blocks to engage the surface of a paramagnetic workpiece and thus magnetically couple the base to the workpiece. This magnet is preferably magnetized and oriented so that the opposite long sides thereof constitute the north and south poles and, as shown in FIGS. 6 and 7, serves to anchor the base component to any magnetizable surface or element on which it may be mounted. Referring to FIG. 6, the magnet 34 moves outwardly to the outer plane defined by the surfaces 9 into engagement with a surface S to which the device is secured by magnetic attraction, while in FIG. 7 it moves outwardly from the stop member 6 only sufficiently to engage the surface of the rounded body S' on which the base component 1 is mounted and held. When the device is to be used with non-magnetic materials, conventional means for clamping it to the part or machine element with which it is employed would, of course, be used.

While in the foregoing specification there has been disclosed a presently preferred embodiment of the invention, the invention is not to be deemed to be limited to the precise details of construction thus disclosed by way of example, and the invention will be understood to include as well all such changes and modifications in the parts and in the construction, combination and arrangement of parts, as shall come within the purview of the appended claims.

We claim:
1. A sine bar device for determining angular relations in machine components and similar articles, said device comprising a base having a workpiece contacting surface and a sine bar contacting surface extending parallel to said workpiece contacting surface, a sine bar component carried by said base and comprising an elongated body member having a first cylindrical bar disposed transversely to the length of said body member and mounted at one end of said body member and a second cylindrical bar disposed parallel to said first bar and disposed at the opposite end of said body member, means mounting said sine bar component on said base member with said first cylindrical bar disposed adjacent to said sine bar contacting surface including a portion of said mounting means having a bore providing bearing engagement with said first cylindrical bar thereby affording a pivot for angular movement of said sine bar component about the longitudinal axis of said first cylindrical bar, means interconnecting said mounting means and said base manually operable to effect movement of said mounting means toward and away from said base whereby said first cylindrical bar may be moved out of contact with said sine bar contacting surface of said base for free pivotal movement of said sine bar component or be clamped against said sine bar contacting surface for locking said sine bar component in any pivotal position to which it may have been moved.

2. A sine bar device as claimed in claim 1 in which said second bar is mounted at the same side of said body component as said first bar.

3. A sine bar device as claimed in claim 1 in which said second cylindrical bar is of lesser diameter than said first cylindrical bar.

4. A sine bar device as claimed in claim 1 in which said body member of said sine bar component is cut away to expose the entire circumference of one end of said second cylindrical bar.

5. A sine bar device as claimed in claim 1 in which said locking means operates between said base and said mounting means for said sine bar component.

6. A sine bar device as claimed in claim 1 in which said base is formed with an opening in said workpiece engaging surface communicating with the hollow interior of said base and in which a magnetic element is loosely mounted in said hollow base and is operable through said opening to secure said base to a paramagnetic surface on a workpiece by reason of the magnetic attraction of said base and the workpiece for each other induced by said magnetic element.

7. A sine bar device as claimed in claim 1 in which said base is mountable on a workpiece on either a flat surface on the workpiece or on a curved surface on the workpiece in parallelism with the axial line of such curved surface.

8. A sine bar device as claimed in claim 6 in which said magnetic element is operative to secure said base optionally either on a flat surface or on a curved surface of a paramagnetic workpiece.

References Cited by the Examiner
UNITED STATES PATENTS

| | | | |
|---|---|---|---|
| 1,382,717 | 6/1921 | Duplessie | 33—174 |
| 1,409,343 | 3/1922 | Karasick | 33—174 |
| 2,032,728 | 3/1936 | Verderber | 33—174 |
| 2,398,121 | 4/1946 | Silvermaster | 33—174 |
| 2,649,785 | 8/1953 | Sirko | 33—174 |
| 3,109,242 | 11/1963 | Nyitrai | 33—174 |
| 3,133,356 | 5/1964 | Mercier | 33—179 |

FOREIGN PATENTS 119,289    9/1918    Great Britain.

LEONARD FORMAN, *Primary Examiner.*

ISAAC LISANN, *Examiner.*